United States Patent
Bulut et al.

(10) Patent No.: US 11,146,586 B2
(45) Date of Patent: *Oct. 12, 2021

(54) DETECTING A ROOT CAUSE FOR A VULNERABILITY USING SUBJECTIVE LOGIC IN SOCIAL MEDIA

(71) Applicant: INTERNATIONAL BUSINESS MACHINES CORPORATION, Armonk, NY (US)

(72) Inventors: Muhammed Fatih Bulut, Ossining, NY (US); Lisa Chavez, Placitas, NM (US); Jinho Hwang, Ossining, NY (US); Anup Kalia, Elmsford, NY (US); Virginia Mayo Policarpio, Jersey City, NJ (US); Sai Zeng, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/734,322

(22) Filed: Jan. 4, 2020

(65) Prior Publication Data

US 2020/0153851 A1 May 14, 2020

Related U.S. Application Data

(63) Continuation of application No. 15/825,089, filed on Nov. 28, 2017, now Pat. No. 10,587,643.

(51) Int. Cl.
*H04L 29/06* (2006.01)
*H04L 12/58* (2006.01)
*G06Q 50/00* (2012.01)

(52) U.S. Cl.
CPC ......... *H04L 63/1433* (2013.01); *G06Q 50/01* (2013.01); *H04L 51/32* (2013.01); *H04L 63/1441* (2013.01)

(58) Field of Classification Search
CPC ...... H04L 63/1433; H04L 51/32; G06Q 50/01
(Continued)

(56) References Cited

U.S. PATENT DOCUMENTS 7,664,845 B2  2/2010  Kurtz et al.
9,258,321 B2  2/2016  Amsler et al.
(Continued)

OTHER PUBLICATIONS

List of IBM Patents and or Applications Treated as Related, 2 pgs.
(Continued)

*Primary Examiner* — Dant B Shaifer Harriman
(74) *Attorney, Agent, or Firm* — Intelletek Law Group, PLLC; Gabriel Daniel, Esq.

(57) ABSTRACT

A method and system of identifying a computing device vulnerability is provided. Social media communication is monitored. Social media threads that are related to a vulnerability, based on the monitored social media communication, are identified, filtered, and categorized into one or more predetermined categories of computing device vulnerabilities. Upon determining that a number of social media posts related to the vulnerability is above a first predetermined threshold, one or more dependable social media threads in a same one or more categories as the vulnerability are searched. One or more possible root causes of the vulnerability are determined from the searched dependable social media threads. A validity score for each of the one or more possible root causes is assigned. A possible root cause from that has a highest validity score that is above a second predetermined threshold is selected to be the root cause of the vulnerability.

19 Claims, 7 Drawing Sheets

(58) Field of Classification Search
USPC .......................................................... 726/25
See application file for complete search history.

(56) References Cited

U.S. PATENT DOCUMENTS

| | | | | |
|---|---|---|---|---|
| 9,374,374 | B2* | 6/2016 | Steinberg | H04L 63/10 |
| 9,451,085 | B2* | 9/2016 | Skiba | H04L 51/32 |
| 9,514,133 | B1* | 12/2016 | Kursun | G06F 40/279 |
| 9,544,327 | B1 | 1/2017 | Sharma et al. | |
| 9,571,465 | B1 | 2/2017 | Sharifi Mehr et al. | |
| 9,697,362 | B2 | 7/2017 | Kaplan et al. | |
| 10,516,567 | B2* | 12/2019 | Foster | H04L 67/146 |
| 10,992,698 | B2* | 4/2021 | Patel | H04L 63/1433 |
| 2013/0018823 | A1* | 1/2013 | Masood | H04L 63/1441 706/12 |
| 2013/0151531 | A1 | 6/2013 | Li et al. | |
| 2014/0172495 | A1* | 6/2014 | Schneck | G06Q 10/0635 705/7.28 |
| 2015/0242515 | A1* | 8/2015 | Trabelsi | G06F 16/9535 707/710 |
| 2015/0242637 | A1 | 8/2015 | Tonn et al. | |
| 2016/0300227 | A1 | 10/2016 | Subhedar et al. | |
| 2016/0379326 | A1 | 12/2016 | Chan-Gove et al. | |
| 2017/0013014 | A1 | 1/2017 | Foster et al. | |
| 2017/0061133 | A1* | 3/2017 | Trabelsi | G06F 21/577 |
| 2017/0177879 | A1 | 6/2017 | Sharma et al. | |
| 2017/0206271 | A1* | 7/2017 | Jain | G06F 16/3344 |
| 2017/0206557 | A1* | 7/2017 | Abrol | G06Q 30/0269 |
| 2018/0124094 | A1* | 5/2018 | Hamdi | H04L 63/20 |
| 2019/0014148 | A1* | 1/2019 | Foster | G06N 3/0445 |
| 2019/0095820 | A1* | 3/2019 | Pourmohammad | G06N 20/20 |
| 2020/0036743 | A1* | 1/2020 | Almukaynizi | G06N 5/048 |
| 2020/0210590 | A1* | 7/2020 | Doyle | G06F 8/77 |
| 2020/0234243 | A1* | 7/2020 | Miron | G06Q 10/107 |
| 2020/0374311 | A1* | 11/2020 | Madhu | H04L 67/18 |

OTHER PUBLICATIONS

Guan, et al., "Using social media data to understand and assess disasters," Nat Hazards, DOI 10.10071/s11069-014-1217-1, May 22, 2014, 17 pages.

Sabottke, et al., "Vulnerability Disclosure in the Age of Social Media: Exploiting Twitter for Predicting Real-World Exploits," 24th USENIX Security Symposium, Aug. 12-14, 2015, pp. 1041-1056.

Mulwad, et al., "Extracting Information about Security Vulnerabilities from Web Text," Proceedings of the Web Intelligence for Information Security Workshop, Aug. 2011, Lyon, FR, IEEE Computer Society Press, 4 pages.

Lippmann, et al, "Finding Malicious Cyber Discussions in Social Media," Lincoln Laboratory Journal, vol. 22, No. 1, 2016, pp. 46-59.

Mell, et al, "The NIST Definition of Cloud Computing," Recommendations of the National Institute of Standards and Technology, Special Publication 800-145, Sep. 2011, pp. 1-3.

* cited by examiner

DETECTING A ROOT CAUSE FOR A VULNERABILITY USING SUBJECTIVE LOGIC IN SOCIAL MEDIA

BACKGROUND

Technical Field

The present disclosure generally relates to computer security, and in particular, to detecting vulnerabilities of computing devices by electronic analysis of social media.

Description of the Related Art

In recent years, the Web has become an increasingly important resource of information about computer security threats, such as Botnet, distributed denial of service (DDoS), malware, and the like, collectively referred to herein as a computing device vulnerability. Malicious parties frequently use social media networks to discuss cyber-attacks, identify potential victims, discuss strategies, etc. Upon release of a vulnerability, victims and experts frequently discuss the symptoms of their malfunctioning computing device using social media to find remedy. While monitoring social media networks is a valuable way of discovering malicious cyber activity and remedies thereof, traditional approaches lack automation capabilities to timely and resource efficiently identify vulnerabilities and solutions to the vulnerabilities.

SUMMARY

According to various embodiments, a computing device, a non-transitory computer readable storage medium, and a method are provided of identifying a computing device vulnerability. Social media communication is monitored. Social media threads that are related to a vulnerability of a computing device are identified, based on the monitored social media communication. Each identified social media threads is filtered by removing SPAM postings therefrom, and categorized into one or more predetermined categories of computing device vulnerabilities. Upon determining that a number of social media posts related to the vulnerability is above a first predetermined threshold, one or more dependable social media threads in a same one or more categories as the vulnerability is searched. One or more possible root causes of the vulnerability are determined from the searched dependable social media threads. A validity score is assigned for each of the one or more possible root causes. A possible root cause from the one or more possible root causes that has a highest validity score that is above a second predetermined threshold is selected to be the root cause of the vulnerability.

In one embodiment, identifying dependable social media threads for the one or more predetermined categories includes, during a training phase, receiving a training social media communication. For each thread of the training social media communication, a peer vote, a status of the contributor, a number of views, or a number of comments parameters is evaluated. Further, a dependability of the thread of the training social media communication based on the evaluated parameters is rated. The thread of the training social media communication is stored as a dependable social media thread if the rating of the dependability of the thread is above a predetermined threshold for its category, such that the thread of the training social media communication is available to be searched during a monitoring or resolution phase. The monitoring and resolution phases are after the training phase.

In one embodiment, upon determining the root cause of the vulnerability, a notification is sent to one or more computing devices that are deemed to be affected or are at risk to be affected by the identified vulnerability.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure relates to systems and methods of detecting vulnerabilities and solutions thereof via social media. Social media includes, without limitation, computer help forums, hacker blogs and forums, chat rooms, and social media streams, such as Twitter, Pinterest, Facebook, Instagram, etc. Victims experiencing a security threat, security vendors, system administrators, and hackers (sometimes referred to herein as malicious parties), who discuss vulnerabilities on social media sites (e.g., Twitter), provide a rich source of information. Indeed, malicious parties often discuss technical details about exploits and the victims of attacks share their experiences. Also, in some scenarios, vulnerabilities that can be identified via social media communication would not be identified or reported early enough to system administrators. Even though such social media feeds can be inaccurate and replete with misinformation, applicants have identified efficient ways of mining and aggregating the social media fees to electronically analyze the data therein.

Accordingly, what is provided herein is a method and system for identifying a computing device vulnerability. Social media communication is monitored at predetermined intervals, together providing a continuous monitoring of social media. Social media threads that are related to a vulnerability of a computing device are identified, based on the monitored social media communication. The social media communication is filtered to remove irrelevant information therefrom and categorized into appropriate threat categories. Social media threads, that are deemed to be dependable, are searched for possible root causes of the vulnerability. The possible root causes are ranked to identify the most likely root cause.

By virtue of the concepts discussed herein, an early detection of a vulnerability is provided. Further, a root cause of the vulnerability can be identified, the evolution of existing vulnerabilities can be tracked to mitigate their effects, and a solution to the vulnerability can be provided. Reference now is made in detail to the examples illustrated in the accompanying drawings and discussed below.

Example Architecture

Figure 1:
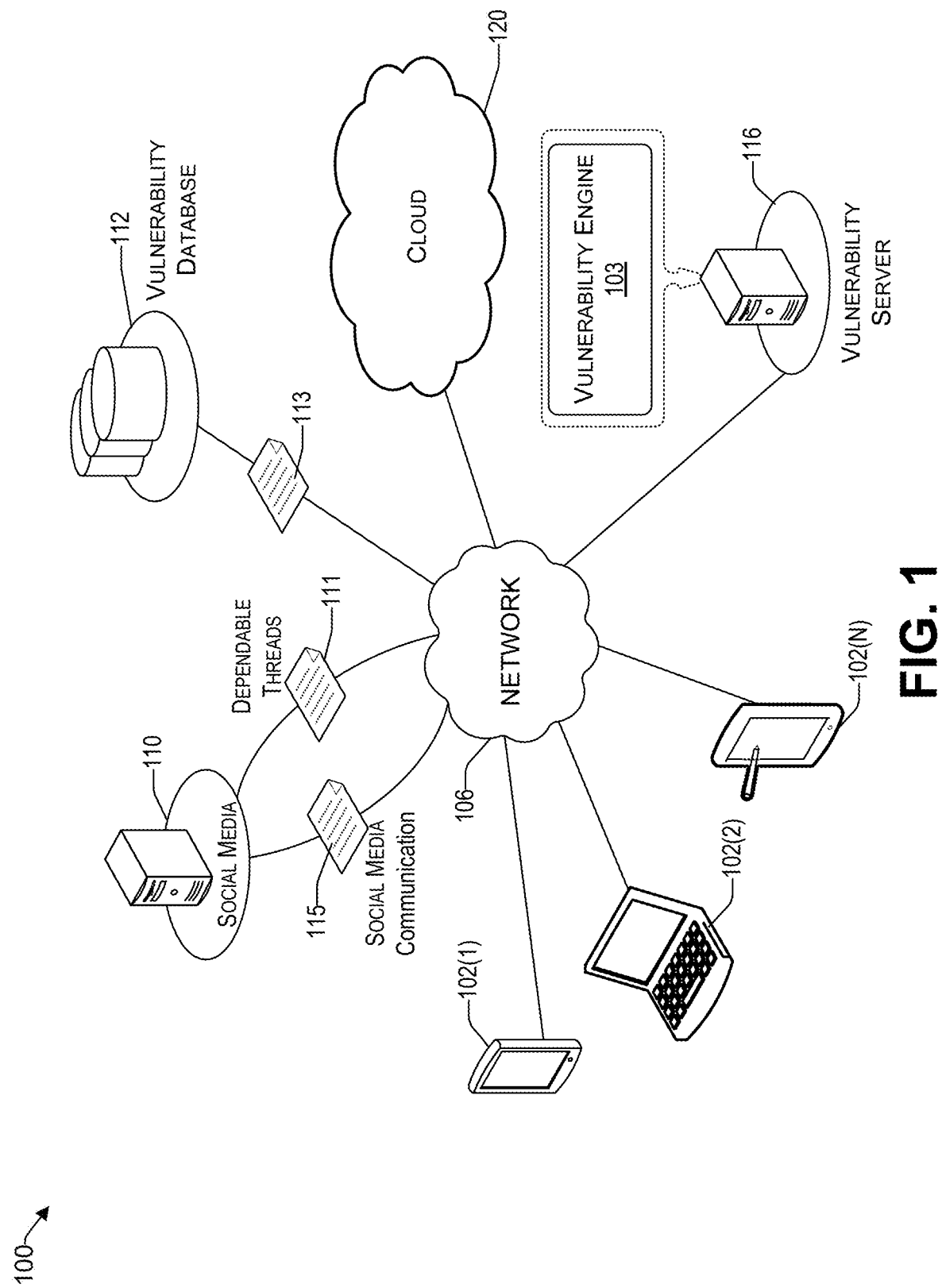
FIG. 1 illustrates an example architecture for identifying a vulnerability related to computing devices via social media.

FIG. 1 illustrates an example architecture 100 for identifying a vulnerability related to computing devices via social media. Architecture 100 may include one or more computing devices 102(1) to 102(N), one or more social media servers 110, a vulnerability database 112, a vulnerability server 116 having a vulnerability engine 103, and a cloud 120.

The network 106 allows various users to communicate with each other users (i.e., via their computing devices 102(1) to 102(N)) and various resources that are connected to the network 106, such as a social media server 110, a vulnerability database 112, vulnerability server 116 and the cloud 120.

The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet, that provides various ancillary services, such as communication with various application stores, libraries, the Internet, and the cloud 120. A computing device (e.g., 102(1) to 102(N)), among other functions, allows a user to communicate with other users directly (e.g., via e-mail, text, telephone, etc.) or via social media 110. A computing device 102(1) to 102(N) can also be used to receive notifications and/or updates from the vulnerability server 116. Users of the computing devices may include malicious parties, victims of the malicious parties, and regular users. Regular users may include users who have not have been directly affected by a vulnerability and/or who can participate in social media to discuss vulnerabilities.

For purposes of later discussion, several computing devices appear in the drawing, to represent some examples of the devices that may receive various resources via the network 106. Today, computing devices typically take the form of portable handsets, smart-phones, tablet computers, laptops, desktops, personal digital assistants (PDAs), and smart watches, although they may be implemented in other form factors, including consumer, and business electronic devices.

Social media includes, without limitation, computer help forums, hacker blogs and forums, chat rooms and social media streams, such as Twitter, Pinterest, Facebook, Instagram, and the like, collectively represented herein by way of a social media server 110, which is configured to facilitate communication between subscribers via their computing devices 102(1) to 102(N). The social media 110 is a source of social media communication 115 for the vulnerability server 116, as well as dependable threads 111, discussed in more detail later.

Architecture 100 may include a vulnerability database 112 configured to store and maintain an up-to-date list of present network and/or user device 102(1) to 102(N) security concerns. For example, the vulnerability database 112 may be maintained by a security software company or a consortium of organizations and/or individuals interested in network security, such as the National Vulnerability Database (NVD), US-CERT Vulnerability Notes Database, Open Sourced Vulnerability Database (OSVDB), X-FORCE by IBM, and the like. The vulnerability database 112 provides data 113 that includes network security information in the form of data packets to the vulnerability engine 103 of the vulnerability server 116, at predetermined intervals or upon a trigger event. The security information 113 from the vulnerability database 112 can be used by the vulnerability engine 103 to identify signatures of active and potential vulnerabilities that may be affecting the network 106 and the computing devices 102(1) to 102(N) coupled thereto. In some embodiments, the signature may include key terms that are consistent with a vulnerability.

In one embodiment, machine learning may be used by the vulnerability engine 103 to learn from the security information (sometimes referred to herein as historic data or example data) 113 received from the vulnerability database 112 during a training phase. Machine learning is a subfield of computer science that evolved from the study of pattern recognition and computational learning theory in artificial intelligence. Machine learning is used herein to construct algorithms that can learn from and make predictions based on the data stored in the vulnerability database 112. Such algorithms operate by building a model from stored prior inputs or baselines therefrom to make data-driven predictions or decisions (OR to provide threshold conditions to indicate a vulnerability), rather than following strictly static criteria.

Based on the machine learning, patterns, trends, and key words that are consistent with a vulnerability are identified from the social media communication 115. In various embodiments, the machine learning discussed herein may be supervised or unsupervised. In supervised learning, the monitoring server may be presented with example data 113 from the vulnerability database 112 as being acceptable. Put differently, the vulnerability database 112 acts as a teacher for the monitoring server. In unsupervised learning, the vulnerability database 112 does not provide any labels as what is acceptable, rather, it simply provides historic data (e.g., 113) to the vulnerability engine 103 that can be used together with the recently harvested social media communication 115 from the system to find its own structure among the data. In various embodiments, the machine learning may make use of techniques such as supervised learning, unsupervised learning, semi-supervised learning, naive Bayes, Bayesian networks, decision trees, neural networks, fuzzy logic models, deep learning, and/or probabilistic classification models.

The architecture 100 includes a vulnerability engine 103, which is a software program that runs on the vulnerability server 116. In one embodiment, in a training phase, the vulnerability engine 103 is configured to develop models via machine learning, based on the security information 113 it receives from the vulnerability database 112, to identify vulnerabilities in social media communication 115 that it receives.

In various embodiments, the social media communication 115 may be received continuously in real time, at predetermined intervals (e.g., every 10 minutes, every day, etc.) or upon a trigger event, e.g., upon the vulnerability database 112 indicating that there is an increased network security concern. The vulnerability engine 103 may discard social media that is deemed to be SPAM. For example, tweets that are intended for marketing, have links to URLs that are deemed to be problematic, mention a threshold number of unrelated users, etc., are removed from the social media communication packet 115 by the vulnerability engine 103, thereby reducing the volume of data to be processed. In various embodiments, keywords, machine learning, or a combination thereof may be used to discern the intent of each social media communication in the data packet 115.

For example, natural learning processing (NLP) can be used to process the raw natural language content of each communication in the data packet 115. This natural language content may be received in the form of text or voice. Regarding the latter, the vulnerability engine 103 can perform speech recognition to determine the textual representation thereof. In natural speech, there may not be discernable pauses between successive words. To that end, speech segmentation may be performed to separate the words into meaningful sentences.

In one embodiment, concept expansion, such as the IBM Watson concept expansion, can be used to identify the concept cues in each communication to determine the intent thereof. In this regard, large sets of unstructured sets of data may be provided to the vulnerability engine 103 during a training phase, such that it can learn therefrom. The large sets of unstructured data may relate to prior communication that is deemed to be SPAM (e.g., by a SPAM filter repository—not shown), which now acts as a corpus of data to learn from. Such concept expansion enables the creation of a specialized dictionary for the cognitive application of identifying the subject matter and scope of the communication, collectively referred to herein as the "intent" of the social media communication (e.g., tweet). Concept expansion enables the vulnerability engine 103 to build a specialized dictionary for the cognitive application of interacting with the social media communication 115 that may be stored in a memory of the vulnerability server 116 (or any other suitable repository, such as the cloud 120). Thus, unstructured source text that may not include well-formed language, such as email, text messages, and text that has been extracted via speech recognition, can be analyzed to discern its intent. Accordingly, the vulnerability engine 103 can correctly understand industry specific terminology, local euphemisms, and colloquial terms that may be encountered in social media. In this way, social media communication that is deemed to be SPAM (e.g., has a marketing effect) can be filtered out.

Figure 2:
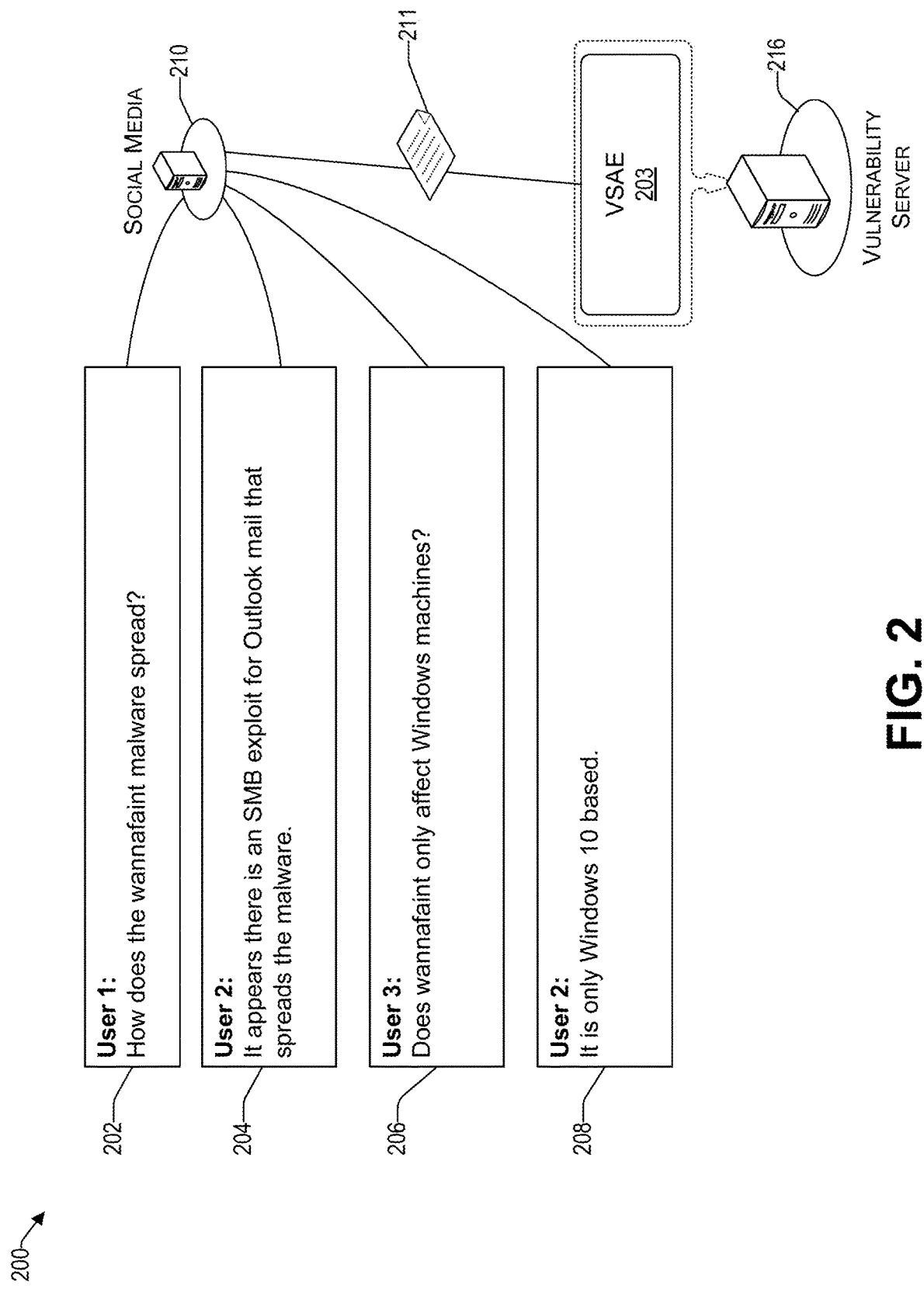
FIG. 2, which illustrates a conceptual diagram of a social media communication that is related to a vulnerability.

During a monitoring phase, the vulnerability engine 103 is configured to determine whether a communication or a communication thread of the social media communication 115 is related to a vulnerability, by way of the machine learning that may have been performed earlier (i.e., training phase), as discussed above. In this regard, reference is made to FIG. 2, which illustrates a conceptual diagram of a social media communication thread 200 that is related to a vulnerability. By way of example, and not by way of limitation, the communication 200 is illustrated as a thread of tweets between several participants. The vulnerability engine 203 running on the vulnerability server 216 is able to determine (i) that each post of the communication 200 is not related to SPAM, (ii) that the communication 200 is related to a vulnerability, and (iii) the category of the vulnerability (discussed in more detail below).

Figure 3:
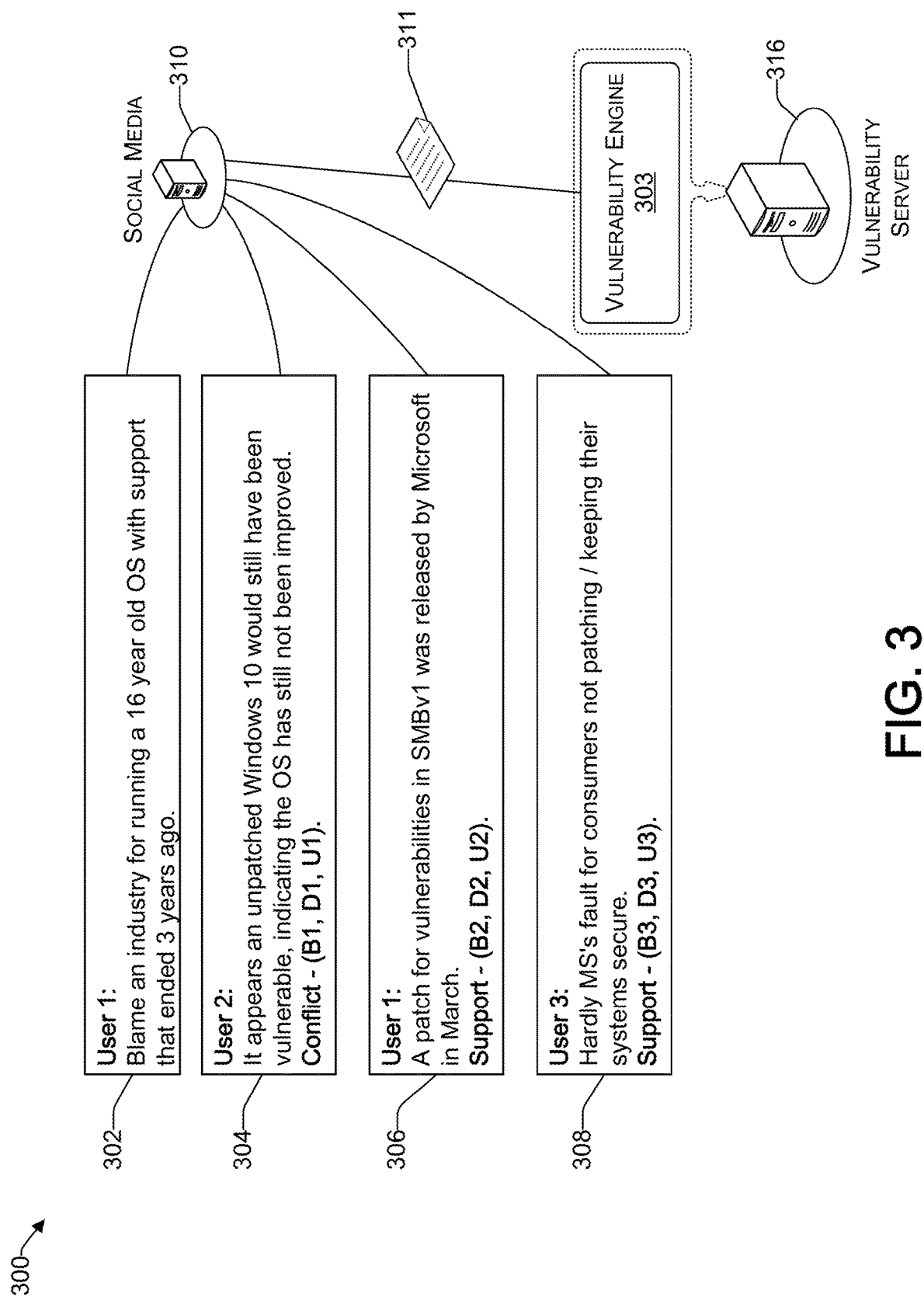
FIG. 3 illustrates a conceptual diagram of a social media communication that is related to a possible solution to a vulnerability.

Accordingly, upon identifying a vulnerability, the vulnerability engine 103 is configured to classify the vulnerability into a predetermined category. The categories may include, without limitation, Denial of Service (DOS), SQL Injection, code execution, memory corruption, etc., In this regard, FIG. 3 illustrates an example column chart of identified vulnerabilities in a predetermine time period. In some scenarios, a vulnerability may be related to more than one category.

Upon determining that the number of vulnerabilities is above a predetermined threshold for an identified vulnerability in a category for a time period, the vulnerability engine 103 can proceed from the monitoring phase to a resolution phase. In various embodiments, the predetermined threshold may be different for each category, based on the potential harm that it can cause. By virtue of categorizing the identified vulnerability, a more focused approach to resolving the vulnerability is provided. For example, databases and/or social media forums that are related to the identified category are solicited for the resolution of the vulnerability, thereby reducing the computing resources involved in processing the large volume of data received from social media, as discussed in more detail below.

In one embodiment, machine learning is used for the classification of identified vulnerabilities into one or more categories. For example, support vector machines (SVMs), which are supervised learning models with associated learning algorithms that analyze data used for classification and regression analysis, can be used. To that end, the vulnerability engine 103 may receive training examples from the vulnerability database 112.

The vulnerability engine 103 is also configured to identify and search dependable threads 111 for different categories that include communication related to the identified vulnerability. In various embodiments, the identification may be during the training, monitoring, or resolution phase. For example, dependable threads may be identified from the received social media communication 115 for different categories, during a training (or monitoring phase), and stored in a memory of the vulnerability server 116 (or any other suitable repository, such as the cloud 120). Then, during the resolution phase, the vulnerability engine can retrieve the identified dependable threads 111 for one or more categories related to the subject vulnerability. In this way, a focused search is performed during a resolution phase into the corpus of social media communication, thereby conserving valuable computing resources, reducing the time for resolution of the identified vulnerability, and providing a resolution that is more likely to be successful. The identification of dependable threads is discussed in more detail later.

In one embodiment, in a resolution phase, the vulnerability engine 103 is configured to identify a root cause of the vulnerability. To that end, the vulnerability engine 103 identifies different possible solutions and ranks them based on the dependability (e.g., quality) of the source and/or individual of each solution. The vulnerability engine 103 may receive many such communication threads. From these threads, the vulnerability engine 103 can identify the most likely root cause of the vulnerability, which is discussed in more detail later.

In one embodiment, in a resolution phase, the vulnerability engine 103 is also configured to send notification(s) to appropriate recipients, in response to identifying a vulnerability and/or resolution therefor. The appropriate recipients may be individuals, organizations, or any other suitable entity that may be affected by the identified vulnerability, including the vulnerability database 112. The notification may be sent in various ways, such as common short code (CSC) using a short message service (SMS), multimedia message service (MMS), e-mail, telephone, social media, etc. In various embodiments, the notification can be provided on a user interface of a computing device (e.g., 102(1)) in the form of a message on the screen, an audible tone, a haptic signal, or any combination thereof. In some embodiments, the notification is not only an alert, but a patch (e.g., remedy) for the identified vulnerability.

While the social media 110 server 110, vulnerability database 112, and vulnerability server 116 are illustrated by way of example to be on different platforms, it will be understood that in various embodiments, these platforms may be combined in various combinations. In other embodiments, one or more of these computing platforms may be implemented by virtual computing devices in the form of virtual machines or software containers that are hosted in the cloud 120, thereby providing an elastic architecture for processing and storage. The cloud 120 is discussed in more detail later.

Example Identification of Dependable Social Media Threads

As discussed above, the determination of the root cause of a vulnerability may include the identification of dependable threads in social media. In various embodiments, this identification may be performed during the training, monitoring, or resolution phase. Different types of criteria and/or logic can be used to determine which social media source (e.g., thread or contributor) is dependable. To that end, different criteria may be used, wherein each criterion may be attributed a different weight, to determine dependable social media sources. For example, peer vote, status of the source (whether the contributor is a known authority in the category); number of views, number of comments; the quality of the comments (e.g., positive or negative). Peer vote can be, for example, a rating by a peer as to whether the response was deemed to be helpful. For each tweet that is deemed to be related to a vulnerability, the number of replies, likes, retweets, and influence of the contributor can be used to determine dependability of the tweet in particular and/or thread in general. The threads that are deemed dependable (e.g., that are rated to be above a predetermined threshold) may be stored in their corresponding categories, such that these threads can be later referred to during the monitoring or resolution phase.

In one embodiment, a ranking algorithm, such as PageRank, can be used to determine the dependability of a source. For example, the PageRank algorithm can be adapted to count the number and quality of links to a social media communication to determine how important a social media communication is. The underlying assumption in PageRank (originally developed for Web links) is that more relevant websites are likely to receive more links from other websites. In one embodiment, applicants have used a similar approach to rank the dependability of social media communication. A ranking of a social media communication based on the PageRank algorithm is provided in equation 1 below:

$$PR(A)=(1-d)+d(PR(T_1)/C(T_1)+ \ldots +PR(T_n)/C(T_n)) \quad \text{(Eq. 1)}$$

Where:
d is a damping factor between 0 to 1;
A is the user being evaluated;
Ti is the user who gave a ling to user A; and
C(Ti) is a total count of links from user Ti.

To reduce the volume of social media communication to review, in one embodiment, only social media threads that have a rating that is above a predetermined threshold are deemed to be dependable. In this way, computing resources and time associated in analyzing the social media communication is reduced in the resolution phase.

Example Resolution Phase

The resolution phase, which follows the training and monitoring phase, the root cause of the vulnerability is determined and/or notifications are sent out by the vulnerability engine 103 to provide alerts and/or remedies for the identified vulnerability. To that end, the social media communication that is deemed to be dependable is analyzed to find different possible root causes of the vulnerability. In one embodiment, subjective logic is used to take uncertainty and the veracity of the source into account. In this way, the uncertainty to a root cause of a vulnerability and/or to a solution thereof, can be ranked with respect to other root causes and/or solutions, respectively. In one embodiment, if a veracity score is below a predetermined threshold, then it is not deemed to be an identified root cause (and/or solution); rather, the vulnerability engine 103 may deem it as a possible intelligent guess in a trial and error scenario, which is pursued only when a more likely root cause cannot be discerned from the social media.

For example, arguments in subjective logic are subjective opinions that take values form a domain (sometimes referred to as a state space), where a state value can be thought of as a proposition that can be true or false. For example, a domain may be the type of social media (e.g., Twitter) and the state could represent the root cause or the factors to evaluate the root case. In various embodiments, the opinions can be binomial or multinomial. For example, a multinomial opinion applies to a state variable of multiple possible values.

An opinion is represented as $w_x^A$, where A represents the source of the opinion and x represents a state variable. For example, x can be considered as a binomial opinion, which can be represented as the quadruple $w_x=(b_x, d_x, u_x, a_x)$ where $b_x$ represents the belief that x is true, $d_x$ represents x is false, $u_x$ represents uncertainty, $a_x$ represents the prior probability in the absence of belief or disbelief. Prior probability is a measure of one's belief regarding a quantity before considering any evidence. The foregoing parameters satisfy the relationship of equation 2 below:

$$b_x+d_x+u_x=1 \quad \text{(Eq. 2)}$$

Where:

$b_x, d_x,$ and $u_x$ are [0 to 1]

Opinions of participants in a social media thread can be aggregated. For example, if two opinions <b1, d1, u1> and <b2, d2, u2> support each other, then we compute the aggregation as provided in equation 3 below:

$$<b=(b1+b2)/2, d=(d1+d2)/2, 1-(b+d)> \quad \text{(Eq. 3)}$$

Where:
b1 and b2 represent beliefs from different sources (e.g., social media contributors) that a statement is true; and
d1 and d2 represent beliefs from different sources that a statement is false.

If two opinions <b1, d1, u1> and <b2, d2, u2> conflict each other, then we compute the aggregation as provided in equation 3 below:

$$<b=(b1+d2)/2, d=(d1+b2)/2, 1-(b+d)> \quad \text{(Eq. 4)}$$

By way of demonstrative example, consider a scenario where a social media participant (e.g., a tweeter) is proposing a root cause and/or a mitigation action for an identified vulnerability by the vulnerability engine 103. In this regard, reference is made to FIG. 3, which illustrates a conceptual diagram of a social media communication 300 that is related to a possible solution to a vulnerability identified by the vulnerability engine 303. By way of example, and not by way of limitation, the communication 300 is illustrated as a thread of tweets between several participants. The vulnerability engine 303 running on the vulnerability server 316 receives the communication in the form of a data packet 311 representing a dependable thread.

In the example of FIG. 3, user 1 proposes a root cause 302 for a vulnerability that has been identified by the vulnerability engine 303. Accordingly, the challenge for the vulnerability engine 303 is to attribute a validity score and later compare this score to other validity scores of root causes suggested in other social media threads. To that end, the subjective logic model may be applied as discussed above, where the vulnerability engine 303 leverages the response and credibility of other users participating in the thread to determine a validity score of the thread 300 in general, and the proposed root cause 302 in particular. For example, each response 304 to 308 would be assigned a different $b_x$, $d_x$, and $u_x$ scores, respectively. By aggregating all the scores in the thread, the vulnerability engine 103 can compute the overall $b_x$, $d_x$, and $u_x$ score, representing the validity score of the proposed root cause 302. The subjective logic model relies on evidence provided by users. It does not rely on the credibility of users. Based on the evidence, b, d, u scores can be assigned for each evidence. Further, a sign can be assigned as to whether an evidence is supportive (+) or conflicting (−).

Example Process

Figure 4:
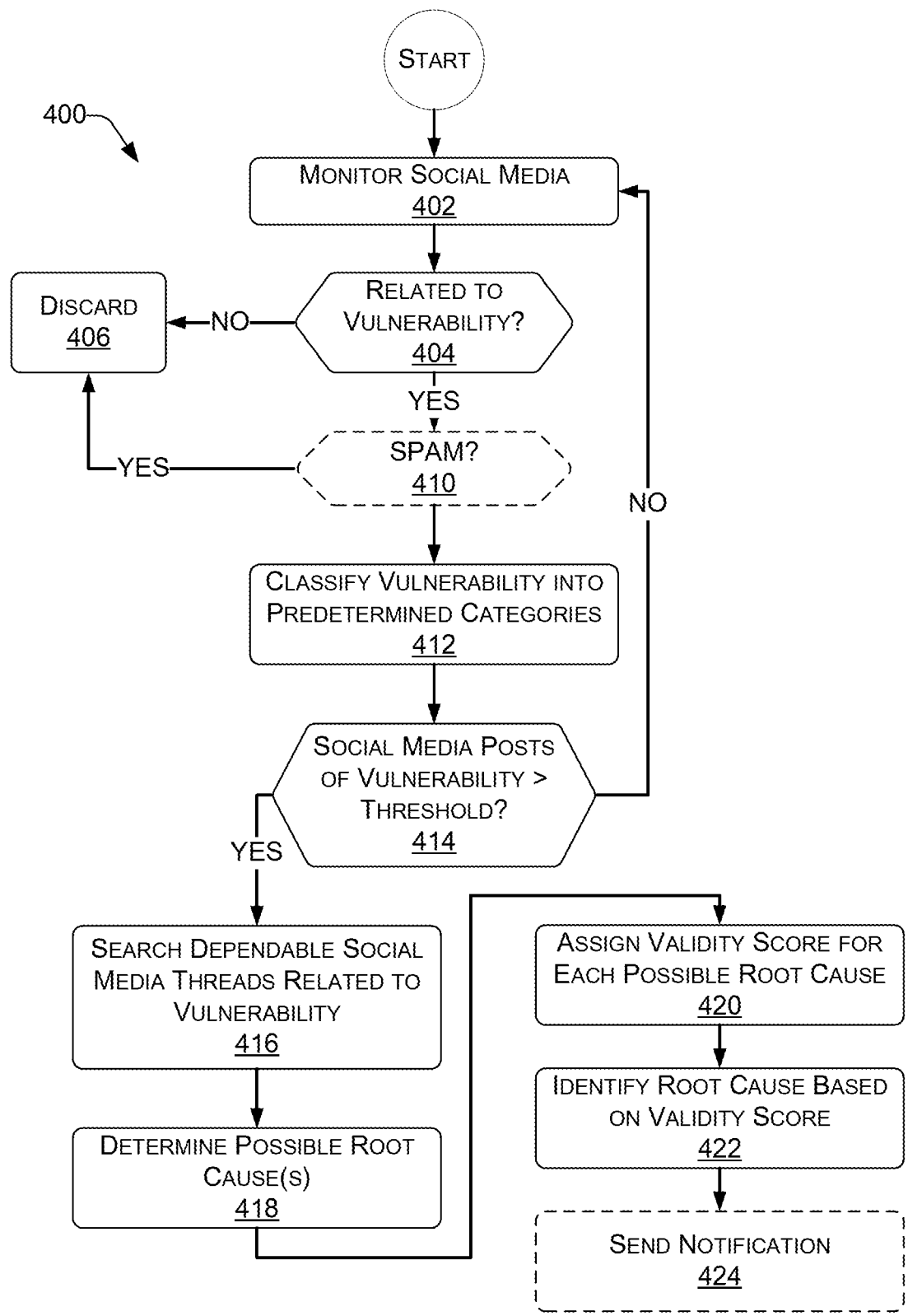
FIG. 4 presents an illustrative process for identifying a vulnerability related to computing devices via social media.

With the foregoing overview of the example architecture 100 and conceptual diagrams of social media communication 200 and 300 that are related to a vulnerability, it may be helpful now to consider a high-level discussion of an example process. To that end, FIG. 4 presents an illustrative process 400 for identifying a vulnerability related to computing devices via social media. Processes 400 is illustrated as a collection of blocks in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described blocks can be combined in any order and/or performed in parallel to implement the process. For discussion purposes, the process 400 is described with reference to the architecture 100 of FIG. 1.

At block 402, the vulnerability engine 103 monitors social media communication 110. In this regard, the social media communication 115 may be received at predetermined intervals or upon a trigger event (e.g., upon the vulnerability database 112 indicating that there is a network security concern that is above a predetermined threshold).

At block 404, for each social media communication 115 received, the vulnerability engine 103 determines whether the communication therein (e.g., social media thread(s)) is related to a vulnerability of a computing device). If not (i.e., "NO" at decision block 404), the process continues with block 406, where the social media communication (e.g., a post or a thread) is discarded. However, upon determining that the social media communication is related to a vulnerability (i.e., "YES" at decision block 404), in various embodiments, the process continues with block 410 or 412.

At block 410, the social media communication is filtered by discarding social media communication that is deemed to be SPAM by the vulnerability engine 103 (i.e., "YES" at decision block 410). Upon filtering, the process continues with block 412, where the vulnerability engine classifies each identified vulnerability into a corresponding predetermined category.

At block 414, the vulnerability engine 103 determines, for each identified vulnerability, whether the number of social media posts related to the vulnerability exceeds a predetermined threshold. In various embodiments, the threshold may be based on the longevity (e.g., time) of the social media communication, volume of the social media communication (e.g., number of posts in a thread and/or a number of threads identifying a substantially similar vulnerability), or a combination thereof. The predetermined threshold may be different for each predetermined category. In this way, more serious threat categories can have a lower trigger point than less consequential threat categories.

Upon determining that the number of social media posts related to the vulnerability is not above the predetermined threshold (e.g., for its category) (i.e., "NO" at decision block 414), the process continues with block 402, thereby continuing to monitor the social media. However, upon determining that the number of social media posts related to the vulnerability is above the predetermined threshold (i.e., "YES" at decision block 414), the process continues with block 416, where the vulnerability engine 103 searches dependable social media threads that are related to the identified vulnerability.

At block 418, one or more possible root causes of the vulnerability are identified from the searched dependable social media threads. In one embodiment, since the search is narrowed to only the one or more predetermined categories of the identified vulnerability, computational resources are conserved and the determination of the possible causes is expedited.

At block 420, a validity score for each of the one or more possible root causes is assigned.

At block 422, a root cause of the vulnerability is identified, based on a root cause that has a highest validity score and is above a predetermined threshold.

At block 424, in one embodiment, the vulnerability engine 103 sends notification(s) to appropriate recipients, in response to identifying a vulnerability and/or resolution therefor. The appropriate recipients may be individuals, organizations, or any other suitable entity that may be affected by the identified vulnerability, including the vulnerability database 112. The notification may be sent in various ways, such as common short code (CSC) using a short message service (SMS), multimedia message service (MMS), e-mail, telephone, social media, etc. In various embodiments, the notification can be provided on a user interface of a computing device (e.g., 102(1)) in the form of a message on the screen, an audible tone, a haptic signal, or any combination thereof. In some embodiments, the notification is not only an alert but a patch (e.g., remedy) for the identified vulnerability.

Example Computer Platform

Figure 5:
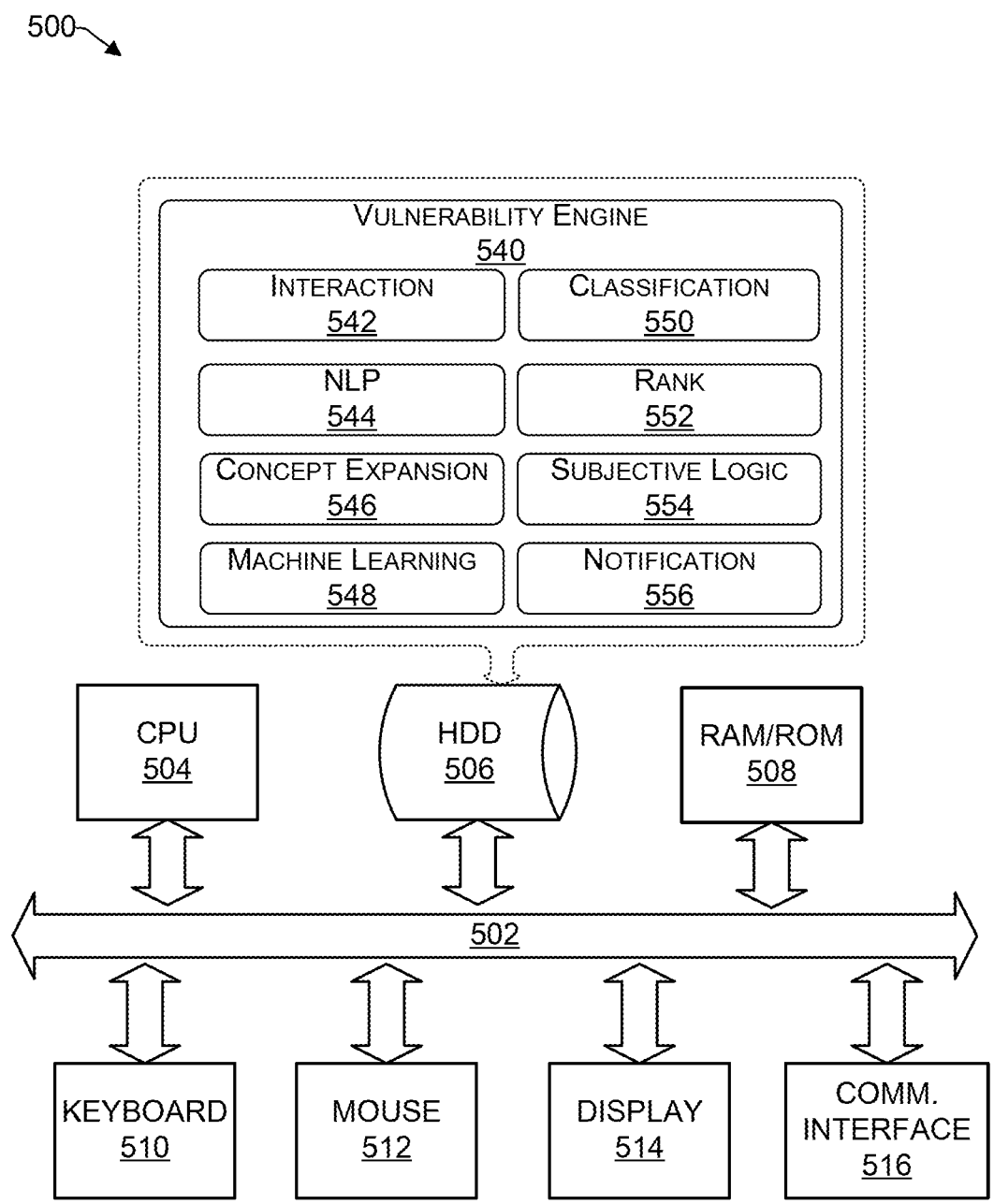
FIG. 5 is a functional block diagram illustration of a computer hardware platform that can communicate with various networked components, consistent with an illustrative embodiment.

As discussed above, functions relating to identifying a vulnerability related to computing devices via social media, can be performed with the use of one or more computing devices connected for data communication via wireless or wired communication, as shown in FIG. 1 and in accordance with the process 400 of FIG. 4. FIG. 5 provides a functional block diagram illustration of a computer hardware platform that is capable of facilitating the monitoring of social media communication, identification of vulnerabilities of computing devices based on the monitored social media communication, determination of a root cause of the vulnerabilities, identification of potential remedies for the vulnerabilities, and the sending of notifications, as discussed herein. In particular, FIG. 5 illustrates a network or host computer platform 500, as may be used to implement a server, such as the vulnerability analysis server 116 of FIG. 1.

The computer platform 500 may include a central processing unit (CPU) 504, a hard disk drive (HDD) 506, random access memory (RAM) and/or read only memory (ROM) 508, a keyboard 510, a mouse 512, a display 514, and a communication interface 516, which are connected to a system bus 502.

In one embodiment, the HDD 506, has capabilities that include storing a program that can execute various processes, such as the vulnerability engine 540, in a manner described herein. The vulnerability engine 540 may have various modules configured to perform different functions.

For example, there may be an interaction module 542 that is operative to receive electronic data from various sources, including social media communication 115, data from dependable threads 111, security information from the vulnerability database 112, and data provided by the cloud 120.

In one embodiment, there is a natural language processing module 544 operative to process the raw natural language content of each communication in the data packet 115. There may be a concept expansion module 548, operative to identify the concept cues in each social media communication to determine the intent thereof. There may be a machine learning module 548 operative to learn from the security information 113 received from the vulnerability database 112 during a training phase. The machine learning module 548 may also aid in identifying SPAM such that it can be removed from social media threads being evaluated.

In one embodiment, there is a classification module 550 operative to place each identified vulnerability into a corresponding predetermined threat category. There may be a subjective logic module 554 operative to take uncertainty and the veracity of the source of a social media communication into account to determine the dependability of a social media communication.

In one embodiment, there is a ranking module 552 that is operative to determine the dependability of a source. There may be a notification module 556 operative to send alerts (e.g., notification(s)) to appropriate recipients, in response to identifying a vulnerability and/or resolution therefor.

In one embodiment, a program, such as Apache™, can be stored for operating the system as a Web server. In one embodiment, the HDD 506 can store an executing application that includes one or more library software modules, such as those for the Java™ Runtime Environment program for realizing a JVM (Java™ virtual machine).

Example Cloud Platform

As discussed above, functions relating to identifying a vulnerability related to computing devices via social media may include a cloud 200. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least fourdeployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
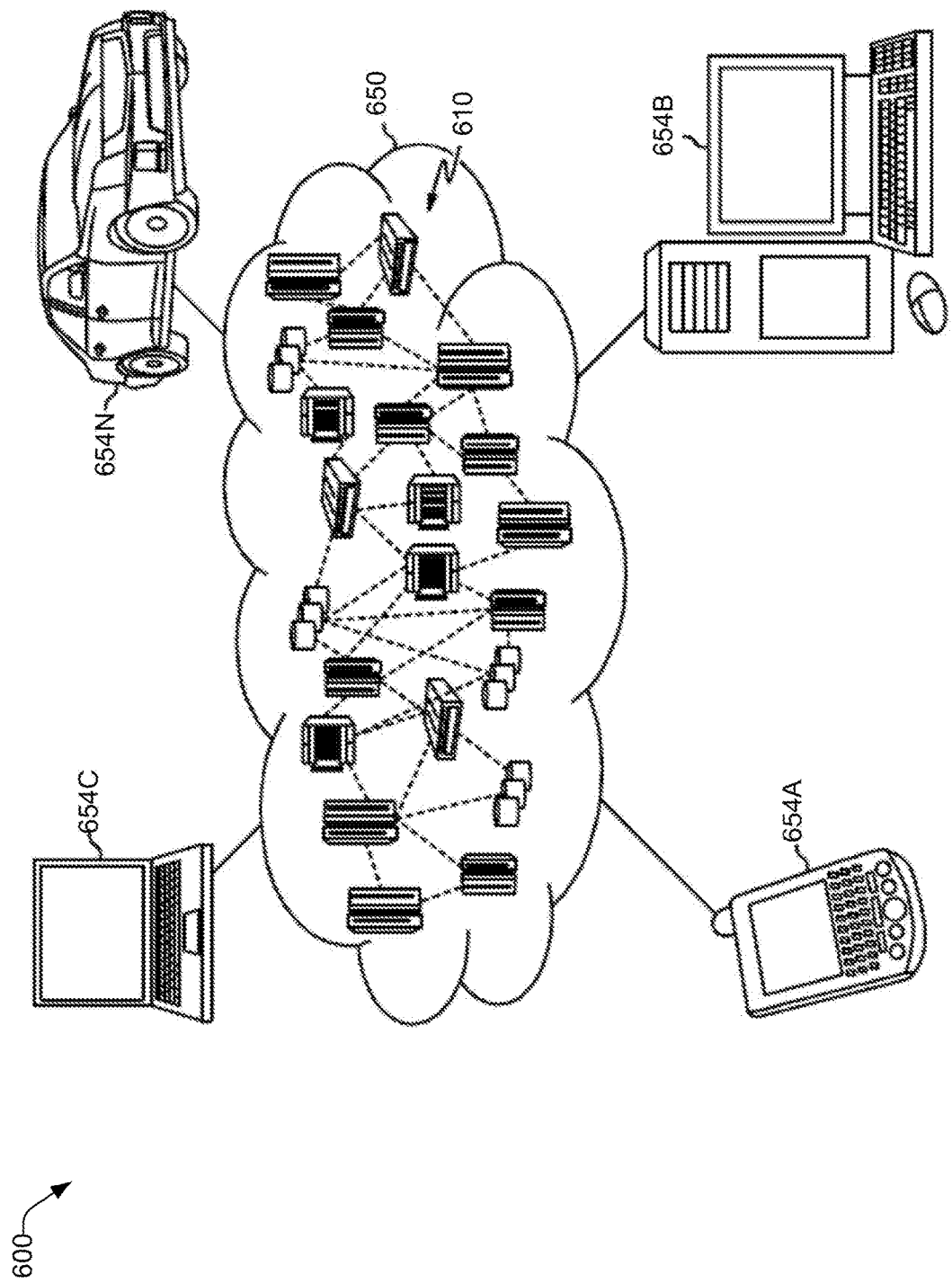
FIG. 6 depicts a cloud computing environment, consistent with an illustrative embodiment.

Referring now to FIG. 6, an illustrative cloud computing environment 600 is depicted. As shown, cloud computing environment 600 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, orHybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
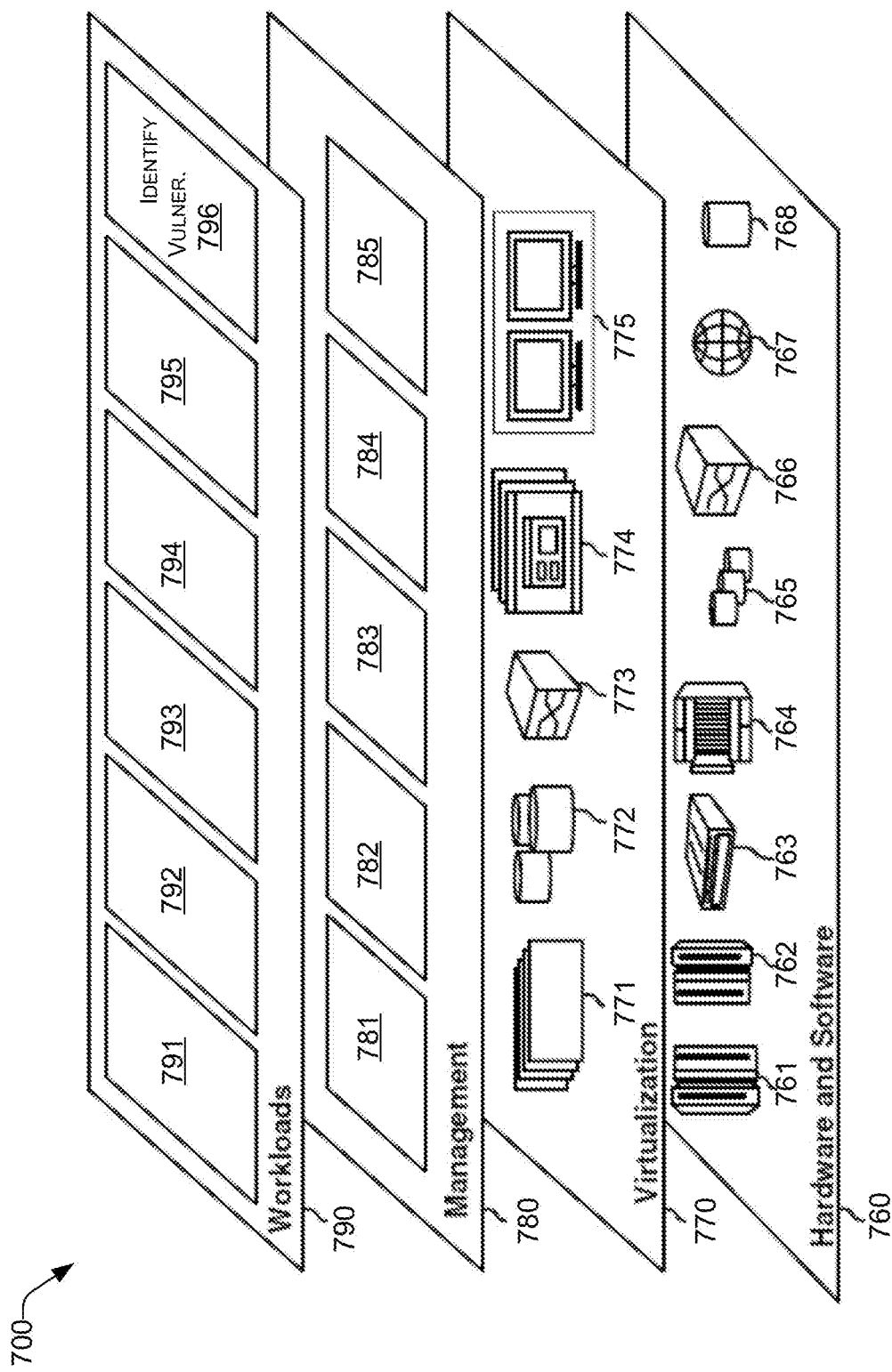
FIG. 7 depicts abstraction model layers, consistent with an illustrative embodiment.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and identifying a vulnerability related to computing devices via social media and solutions therefor 796, as discussed herein.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
a processor;
a network interface coupled to the processor to enable communication over a network;
a storage device coupled to the processor;
a vulnerability engine code stored in the storage device, wherein an execution of the code by the processor configures the computing device to perform acts comprising:
monitoring social media communication;
identifying social media threads that relate to a discussion about a vulnerability of a computing device, based on the monitored social media communication;
filtering the identified social media threads by removing SPAM postings therefrom;
categorizing the filtered identified social media threads into one or more predetermined categories of computing device vulnerabilities;
upon determining that a number of social media posts of the social media threads related to the vulnerability is above a first predetermined threshold:
searching one or more dependable social media threads in a same one or more categories of the vulnerability;
determining one or more possible root causes of the vulnerability from the searched dependable social media threads;
assigning a validity score for each of the one or more possible root causes; and selecting a possible root cause from the one or more possible root causes that has a highest validity score that is above a second predetermined threshold, to be the root cause of the vulnerability; and upon determining the root cause of the vulnerability, sending a notification to one or more computing devices that are deemed to be affected or are at risk to be affected by the identified vulnerability.

2. The computing device of claim 1, wherein monitoring social media communication comprises receiving social media from one or more social media hosts at a predetermined interval via the network interface.

3. The computing device of claim 1, wherein identifying social media threads that are related to a vulnerability of a computing device comprises:

during a given training phase, receiving historic data of social media communication related to one or more vulnerabilities, from a database;

using the historic data for machine learning to construct an algorithm that can identify one or more vulnerabilities of a computing device from social media; and during a given monitoring phase, applying the algorithm to the monitored social media communication, wherein the given monitoring phase is after the given training phase.

4. The computing device of claim 1, wherein filtering the identified social media threads by removing SPAM postings therefrom comprises:

determining an intent of each monitored social media communication via concept expansion; and removing any monitored social media communication that has been determined to have a marketing intent.

5. The computing device of claim 1, wherein the first predetermined threshold is different for each predetermined category of computing device vulnerabilities.

6. The computing device of claim 1, wherein the categories include at least one of:

Denial of Service (DOS);
SQL Injection;
code execution; or
memory corruption.

7. The computing device of claim 1, wherein identifying dependable social media threads for the one or more predetermined categories comprises, during a training phase, receiving a training social media communication, wherein the monitoring and resolution phases are after the training phase.

8. The computing device of claim 1, further comprising, upon determining the root cause of the vulnerability, sending a notification to one or more computing devices that are deemed to be affected or are at risk to be affected by the identified vulnerability.

9. The computing device of claim 8, wherein the notification includes a patch to the identified vulnerability.

10. The computing device of claim 1, wherein subjective logic is used for assigning a validity score for each of the one or more possible root causes.

11. A non-transitory computer readable storage medium tangibly embodying a computer readable program code having computer readable instructions that, when executed, causes a computer device to carry out a method of identifying a computing device vulnerability, the method comprising:

monitoring social media communication;

identifying social media threads that relate to a discussion about a vulnerability of a computing device, based on the monitored social media communication;

filtering the identified social media threads by removing SPAM postings therefrom;

categorizing the filtered identified social media threads into one or more predetermined categories of computing device vulnerabilities;

upon determining that a number of social media posts of the social media threads related to the vulnerability is above a first predetermined threshold:

searching one or more dependable social media threads in a same one or more categories of the vulnerability;

determining one or more possible root causes of the vulnerability from the searched dependable social media threads;

assigning a validity score for each of the one or more possible root causes; and selecting a possible root cause from the one or more possible root causes that has a highest validity score that is above a second predetermined threshold, to be the root cause of the vulnerability; and upon determining the root cause of the vulnerability, sending a notification to one or more computing devices that are deemed to be affected or are at risk to be affected by the identified vulnerability, wherein the notification includes a patch to the identified vulnerability.

12. The non-transitory computer readable storage medium of claim 11, wherein identifying social media threads that are related to a vulnerability of a computing device comprises:

during a given training phase, receiving historic data of social media communication related to one or more vulnerabilities, from a database;

using the historic data for machine learning to construct an algorithm that can identify one or more vulnerabilities of a computing device from social media; and during a given monitoring phase, applying the algorithm to the monitored social media communication, wherein the given monitoring phase is after the given training phase.

13. The non-transitory computer readable storage medium of claim 12, wherein identifying social media threads that are related to a vulnerability of a computing device further comprises:

extracting meaningful sentences from the monitored social media communication via natural learning processing (NLP); and determining an intent of each monitored social media communication via concept expansion.

14. The non-transitory computer readable storage medium of claim 11, wherein filtering the identified social media threads by removing SPAM postings therefrom comprises:

determining an intent of each monitored social media communication via concept expansion; and removing any monitored social media communication that has been determined to have a marketing intent.

15. The non-transitory computer readable storage medium of claim 11, wherein the first predetermined threshold is different for each predetermined category of computing device vulnerabilities.

16. The non-transitory computer readable storage medium of claim 11, wherein the categories include at least one of:

Denial of Service (DOS);
SQL Injection;
code execution; or
memory corruption.

17. The non-transitory computer readable storage medium of claim 11, wherein identifying dependable social media threads for the one or more predetermined categories comprises, during a training phase, receiving a training social media communication, wherein the monitoring and resolution phases are after the training phase.

18. The non-transitory computer readable storage medium of claim 11, wherein subjective logic is used for assigning a validity score for each of the one or more possible root causes.

19. The computing device of claim 3, wherein identifying social media threads that are related to a vulnerability of a computing device further comprises:
  extracting meaningful sentences from the monitored social media communication via natural learning processing (NLP); and
  determining an intent of each monitored social media communication via concept expansion.

* * * * *